(12) United States Patent
Carl

(10) Patent No.: US 10,360,064 B1
(45) Date of Patent: Jul. 23, 2019

(54) TASK SCHEDULING, EXECUTION AND MONITORING

(71) Applicant: Amazon Technologies, Inc., Reno, NV (US)

(72) Inventor: Craig Keith Carl, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 331 days.

(21) Appl. No.: 13/970,402

(22) Filed: Aug. 19, 2013

(51) Int. Cl.
*G06F 9/48* (2006.01)
(52) U.S. Cl.
CPC .................................. *G06F 9/4881* (2013.01)
(58) Field of Classification Search
None
See application file for complete search history.

(56) References Cited

U.S. PATENT DOCUMENTS

| 8,151,103 | B2* | 4/2012 | Jackson | ......................... 713/100 |
| 2005/0010608 | A1* | 1/2005 | Horikawa | ............. G06F 9/4862 |
| 2006/0218554 | A1* | 9/2006 | Tobias | ................... G06F 9/4443 718/102 |
| 2011/0271283 | A1* | 11/2011 | Bell, Jr. | ................ G06F 9/5094 718/102 |
| 2012/0198442 | A1* | 8/2012 | Kashyap | .................... G06F 8/61 718/1 |
| 2012/0246651 | A1* | 9/2012 | Li | .......................... G06F 9/4843 718/101 |
| 2012/0311154 | A1* | 12/2012 | Morgan | .............. H04L 12/6418 709/226 |
| 2013/0055252 | A1* | 2/2013 | Lagar-Cavilla | ....... G06F 9/5077 718/1 |
| 2013/0263140 | A1* | 10/2013 | Eriksson | ............... G06F 9/4843 718/102 |
| 2014/0047341 | A1* | 2/2014 | Breternitz et al. | ............ 715/735 |

OTHER PUBLICATIONS

Moty Michaely, "Sytem and Method for Management of Big Data Sets", Oct. 4, 2014.*

* cited by examiner

*Primary Examiner* — Wynuel S Aquino
(74) *Attorney, Agent, or Firm* — Davis Wright Tremaine LLP

(57) ABSTRACT

A method and apparatus for task scheduling, execution and monitoring are provided. In the method and apparatus, a task package specifying at least one of a task, a task trigger or an execution environment is received. An execution environment is instantiated and the task is sent to the execution environment for execution.

25 Claims, 9 Drawing Sheets

TASK SCHEDULING, EXECUTION AND MONITORING

BACKGROUND

The use of remote program execution and storage services has proliferated in recent years. The resources for remote program execution and storage are often provided by computing resource providers who leverage large-scale networks of computers, servers and storage drives to enable clients, including content providers, online merchants and the like, to host and execute a variety of applications and web services. The content providers and online merchants, who traditionally used on-site servers and storage equipment to host their websites and store and stream content to their customers, often forego on-site hosting and storage and turn to using the resources of the computing resource providers. Remote program execution and storage services allow content providers and online merchants, among others, to efficiently and adaptively satisfy their computing needs, whereby the computing and storage resources used by the content providers and online merchants are added or removed from a large pool provided by a computing resource provider as needed.

It is often important for the users of the computing resource provider to be able to schedule and execute tasks. Further, it is of importance to the users to be able to define parameters for the execution of the tasks. For example, it may be desirable for the task to be executed on an execution environment that is compatible with the execution environments of other hosts of the user.

BRIEF DESCRIPTION OF THE DRAWINGS

Various embodiments in accordance with the present disclosure will be described with reference to the drawings, in which.

DETAILED DESCRIPTION

Figure 1:
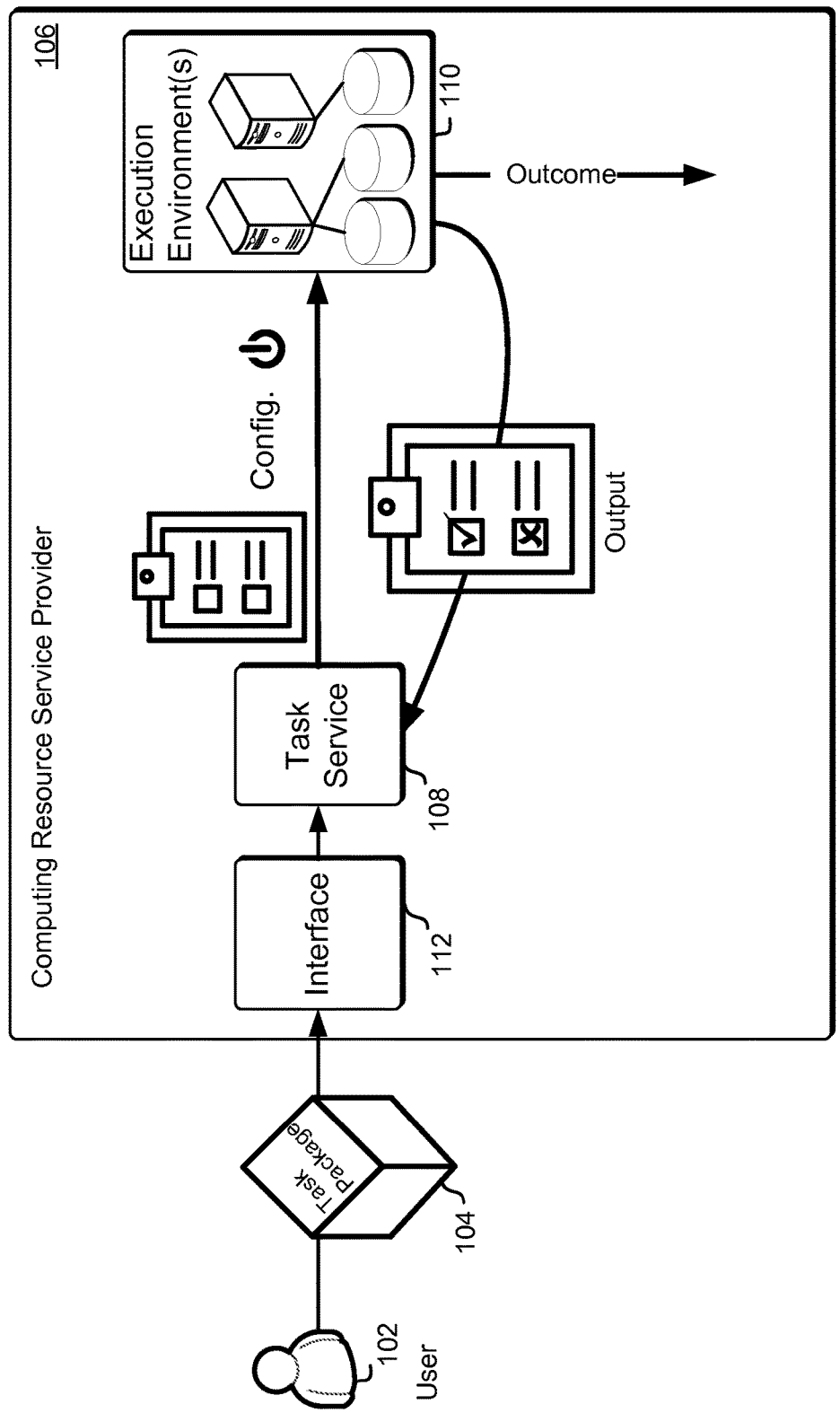
FIG. 1 shows an example of computing resource service provider for receiving and executing tasks.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include receiving by a task service of a computing resource service provider a request for executing a task from a user. The request for executing the task may include a definition or description of the task. The request may be received as a task package and the task may be defined or described using computer-executable commands. An indication of a trigger associated with the task may also be received. The trigger may be a time or an event upon the occurrence of which the task is to be executed. Further, an indication of an execution environment for executing the task may also be received. The execution environment may be or otherwise comprise the computational resources desired to be reserved or used for task execution, such as computing resources, including, physical or virtual computers, servers or hosts, and storage resources, such as memory devices or storage volumes. The execution environment may also be an operating system using which the task is to be executed or tools for decoding and executing the task. The task package may also include exit logic and may be configured to provide one or more return codes upon the execution of the task. The one or more return codes may indicate the success or failure of the execution of the task or a portion thereof and the exit logic may indicate or specify one or more actions to be taken upon the receipt of the return codes. The task package may be text-based, and encoded in a JavaScript Object Notation (JSON) or other structured markup language document.

Upon receiving the task, the task service may determine whether the trigger of the task is a time trigger or an event trigger. If it is determined that the trigger is a time trigger, the task service may utilize a scheduler to schedule the execution of the task at the occurrence of the time trigger. At a time before the occurrence of the time trigger, the scheduler may instantiate an execution environment for executing the task. The execution environment may provide the computational resource required for executing the task and may be equipped to process and execute computational operations and commands. The execution environment may comprise one or more types of computing resource, such as a physical host including a computer, a server or a virtual host, such as a virtual computing environment that utilizes the computing resources of an underlying physical computing platform by way of a hypervisor. Further, the execution environment may comprise one or more memory, data storage or input/output resources, which may include bandwidth resources. The execution environment may be configured with any type of operating system, software or computer-executable commands for task execution.

The execution environment may be compliant to interact or communicate with other execution environments or hosts, for example, other hosts of the user and it may be required that all hosts use the same or compatible execution environments. Further, the task service may configure or equip the execution environment with tools using which the task may be executed. Examples of the tools include computer-executable programs that facilitate decoding the computer-executable commands of the task.

The scheduler may send the task to the execution environment for execution. The scheduler may instruct the execution environment to execute the task at the occurrence of the trigger. The execution environment may execute the task (i.e., one or more components of the execution environment may play one or more roles in completing the task) and may provide an outcome for the task as desired. A monitoring entity of the task service may monitor the progress of the execution of the task and may cause the task to be restarted or the execution environment to be reinstantiated or configured for executing the task. Further, based at least upon the exit logic of the task, actions defined by the task may be taken. Upon completion of the task, the task service may cause the task service to release the execution environment and its associated resources back to the pool of resource of the computing service resource provider to be used for other task or by other users.

If the task is event-triggered and the scheduler is not able to monitor the event trigger of the task, the scheduler may assign a host or execution environment to monitor the event and, similar to time-triggered tasks, execute the task upon the occurrence of the event.

A computing resource service provider may give subscribers access to computing, storage and input/output resources, among others, and enables the subscribers to use the resources to perform a variety of tasks. The computing resources of a computing resource service provider may include physical or virtual hosts, such as physical or virtual computers or servers, and the user may use the hosts to execute a variety of functions. The functions or tasks performed by a host may be contingent upon a time occurrence or event (i.e., trigger-based). A task may be trigger-based, whereby an execution environment may only be required to be active for an interval of time to perform the task. Upon completion of the task, the execution environment or the computing resources associated with the execution environment may be reassigned to perform other tasks. Alternatively, after completion of task execution, the execution environment or the computing resources associated with the execution environment may be used to perform actions as instructed by a user. An example of a trigger-based task is capturing a snapshot of one or more storage volumes every day at noon and storing the captured snapshot in a back-up location. In order to capture and store the snapshot, an execution environment need not be available at all time to perform the task and instead the execution environment may only be required to be available for an interval of time around noon every day to perform the task. The execution environment or its computing resources may be reallocated to perform other tasks at all other times.

It is advantageous to use the task service for scheduling and causing a task to be executed. The task service allows a user or a subscriber to ensure that task execution is performed by externalizing task execution or decoupling task execution. The task service ensures that a task proceeds to execution despite of potential host or server failures.

The computing resource service provider may be configured to accept tasks from subscribers and attend to the execution of the tasks. The computing resource service provider may use a service entity or function to receive a request to perform a task from a subscriber and provision or allocate resources for the execution of the task. The allocation of resources may be performed by assigning and configuring an execution environment to perform the task. The computing resource service provider may further ensure that the task is properly completed. The computing resource service provider may be configured to receive requests for performing tasks from various users that employ various types of computational environments, such as those having hosts that run various types of operating systems and various types of other software for executing tasks.

FIG. 1 shows an example of computing resource service provider for receiving and executing tasks. A user 102 sends a task package 104 to the computing resource service provider 106. The user 102 sends the package via an interface 112, which may be a web services interface utilized by the user to access the resources of the computing resource service provider 106. The task package 104 may include or specify a task that is desired to be executed and an indication of a trigger for the execution of the task. The trigger may be a time or an event upon the occurrence of which the task is sought to be executed. The task package 104 may also indicate or specify an execution environment in which the task is desired to be executed. The execution environment may indicate the resources needed for task execution, which may include computing resources, storage resources of input/output resources. The execution environment may, for example, specify the operating system of a host in which the task is to be executed or a type of software that is sought to be executed on the host and using the operating system. The task package may also include exit logic that indicates actions to be taken that are contingent upon the execution of the task. The task package 104 is received by the computing resource service provider 106 and processed by a task service 108 of the computing resource service provider 106. The task service 108 identifies the task, which may be provided by the user as computer executable instructions that cause a host to perform the task, such as a JSON document or file. The task service 108 also identifies the trigger for the execution of the task and when the trigger occurs or at a time before or after the occurrence of the trigger, the task service 108 instantiates an execution environment 110 for the performing of the task.

The execution environment may be any resource within the computing resource service provider 106 that is used for task execution. As described herein, the resource may be a computational, storage or input/output resources. Instantiating the execution environment 110 includes configuring any resource of the computing resource service provider 106 for task execution. Further, a resource may be configured with any operating system or computer-executable programs or commands specified by the user 104 in the task package 104.

The execution environment 110 may execute the task (e.g., by one or more components of the execution environment each performing one or more operations in accordance with the task) and provide an outcome as a result of the execution of the task. The outcome may be written to a storage location or may be provided to another execution environment of the user 102 in the computing resource service provider 106. The task service 108 may monitor the execution of the task by the execution environment 110. The execution environment may provide an output to the task service 108. The output may be a log file or a task execution return code and may be an indication as to the success or failure of the execution of the task or a portion thereof. Based on the progress, success or failure or received return codes, the task service may proceed as instructed by the exit logic of the task package 104. For example, if the execution of the task is successful, the exit logic may call for initiating or triggering another task. Further, the exist logic may call for reassigning the task to the execution environment 110 or to another execution environment (not shown). When the computational resources of the execution environment 110 or the other execution environment are no longer needed for task execution, the task service 108 may reassign the execution environment 110 or the other execution environment to other tasks or power down the computational resources of the execution environments.

Figure 2:
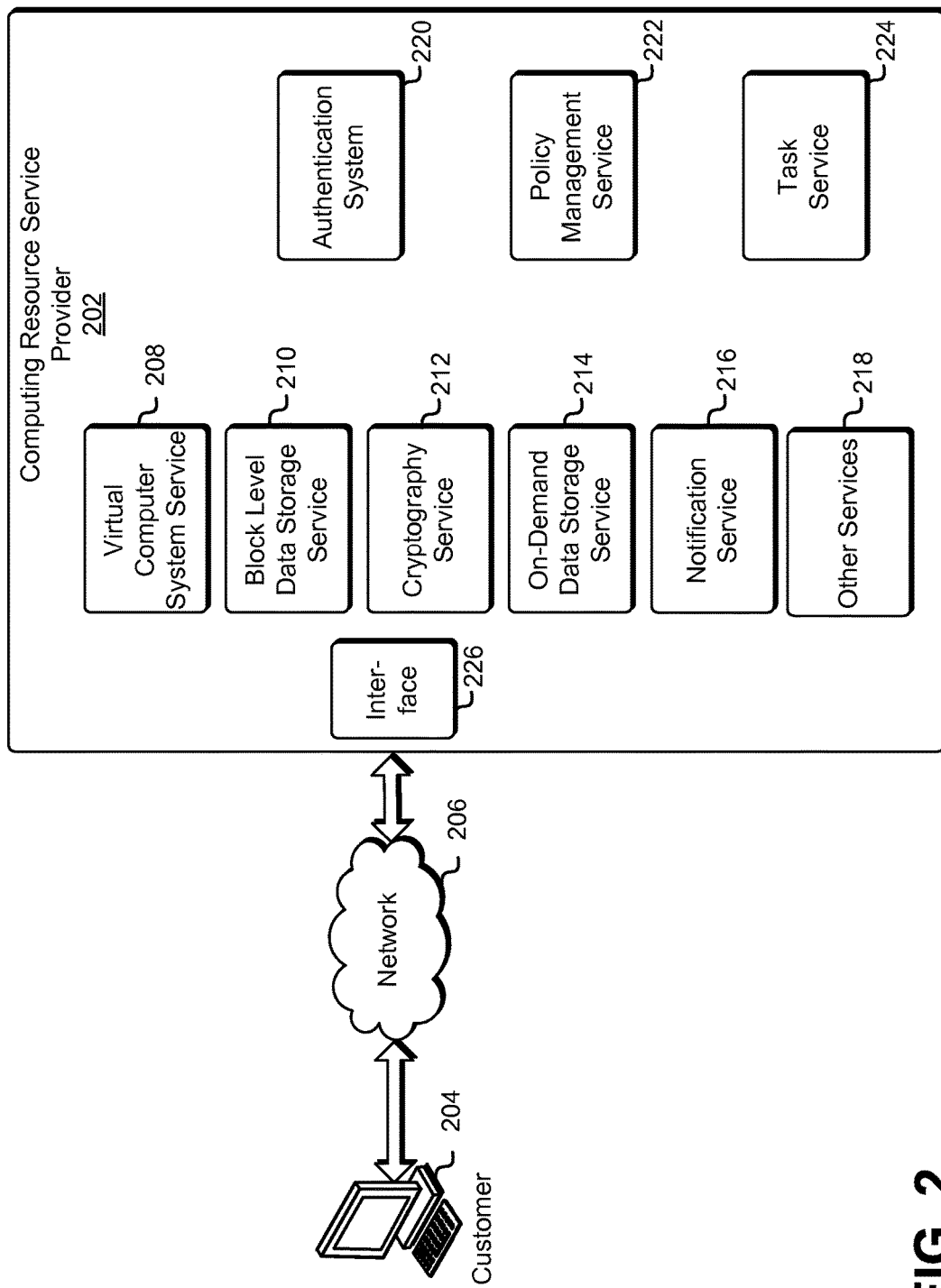
FIG. 2 shows an example of a customer connected to a computing resource service provider.

FIG. 2 shows an example of a customer connected to a computing resource service provider. The computing resource service provider 202 may provide a variety of services to a customer 204 via an interface 226, which may be a web services interface or any other type of customer interface. While FIG. 2 shows an interface 226 for the services of the computing resource service provider, each service may have its own interface and, generally, subsets of the services may have corresponding interfaces in addition to or as an alternative to the interface 226. The customer 204 may be an organization that may utilize one or more of the services provided by the computing resource service provider 202 to maintain and deliver information to its employees, which may be located in various geographical locations. Additionally, the customer 204 may be an individual that utilizes the services of the computing resource service provider 202 to deliver content to a working group located remotely. As shown in FIG. 2, the customer 204 may communicate with the computing resource service provider 202 through a network 206, whereby the network may be a communication network, such the Internet, an intranet or an Internet service provider (ISP) network. Some communications from the customer 204 to the computing resource service provider 202 may cause the computing resource service provider 202 to operate in accordance with one or more embodiment described herein or a variation thereof.

The computing resource service provider 202 may provide various computing resource services to its customers. The services provided by the computing resource service provider 202, in this example, include a virtual computer system service 208, a block-level data storage service 210, a cryptography service 212, an on-demand data storage service 214 and one or more other services 218. It is noted that not all embodiments described herein include the services 208-218 of the computing resource service provider 202 and additional services may be provided in addition to or as an alternative to services explicitly described herein. Each of the services may include one or more web service interfaces that enable the customer 204 to submit appropriately configured API calls to the various services through web service requests. In addition, each of the services may include one or more service interfaces that enable the services to access each other (e.g., to enable a virtual computer system of the virtual computer system service 208 to store data in or retrieve data from the on-demand data storage service 214 and/or to access one or more block-level data storage devices provided by the block level data storage service 210).

The virtual computer system service 208 may be a collection of computing resources configured to instantiate virtual machine instances onto virtual computing systems on behalf of the customers 204 of the computing resource service provider 202. Customers 204 of the computing resource service provider 202 may interact with the virtual computer systems' service (via appropriately configured and authenticated API calls) to provision and operate virtual computer systems that are instantiated on physical computing devices hosted and operated by the computing resource service provider 202. The virtual computer systems may be used for various purposes, such as to operate as servers supporting a website, to operate business applications or, generally, to serve as computing power for the customer. Other applications for the virtual computer systems may be to support database applications, electronic commerce applications, business applications and/or other applications. Although the virtual computer system service 208 is shown in FIG. 2, any other computer system or computer system service may be utilized in the computing resource service provider 202, such as a computer system or computer system service that does not employ virtualization or instantiation and instead provisions computing resources on dedicated or shared computers/servers and/or other physical devices.

The block-level data storage service 210 may comprise one or more computing resources that collectively operate to store data for a customer 204 using block-level storage devices (and/or virtualizations thereof). The block-level storage devices of the block-level data storage service 210 may, for instance, be operationally attached to virtual computer systems provided by the virtual computer system service 208 to serve as logical units (e.g., virtual drives) for the computer systems. A block-level storage device may enable the persistent storage of data used/generated by a corresponding virtual computer system where the virtual computer system service 208 may only provide ephemeral data storage.

The computing resource service provider 202 may also include an on-demand data storage service 214. The on-demand data storage service 214 may be a collection of computing resources configured to synchronously process requests to store and/or access data. The on-demand data storage service 214 may operate using computing resources (e.g., databases) that enable the on-demand data storage service 214 to locate and retrieve data quickly, so as to allow data to be provided in responses to requests for the data. For example, the on-demand data storage service may maintain stored data in a manner such that, when a request for a data object is retrieved, the data object can be provided (or streaming of the data object can be initiated) in a response to the request. As noted, data stored in the on-demand data storage service 214 may be organized into data objects. The data objects may have arbitrary sizes except, perhaps, for certain constraints on size. Thus, the on-demand data storage service 214 may store numerous data objects of varying sizes. The on-demand data storage service 214 may operate as a key value store that associates data objects with identifiers of the data objects which may be used by the customer 204 to retrieve or perform other operations in connection with the data objects stored by the on-demand data storage service 214. The on-demand data storage service 214 may also be accessible to the cryptography service 212. For instance, in some embodiments, the cryptography service utilizes the on-demand data storage service to store keys of the customers in encrypted form, where keys usable to decrypt the customer keys are accessible only to particular devices of the cryptography service 212. Access to the data storage service by a customer, another service, or other entity may be through appropriately configured API calls.

In the environment illustrated in FIG. 2, a notification service 216 is included. The notification service 216 may comprise a collection of computing resources collectively configured to provide a web service or other interface and browser-based management console that can be used to create topics customers want to notify applications (or people) about, subscribe clients to these topics, publish messages, and have these messages delivered over clients' protocol of choice (i.e., HTTP, email, SMS, etc.). The notification service may provide notifications to clients using a "push" mechanism without the need to periodically check or "poll" for new information and updates. The notification service may be used for various purposes such as monitoring applications executing in the virtual computer system service, workflow systems, time-sensitive information updates, mobile applications, and many others.

The computing resource service provider 202 may additionally maintain one or more other services 218 based at least in part on the needs of its customers 204. For instance, the computing resource service provider 202 may maintain a database service for its customers 204. A database service may be a collection of computing resources that collectively operate to run one or more databases for one or more customers 204. Customers 204 of the computing resource service provider 202 may operate and manage a database from the database service by utilizing appropriately configured API calls. This, in turn, may allow a customer 204 to maintain and potentially scale the operations in the database. Other services include, but are not limited to, object-level archival data storage services, services that manage and/or monitor other services and/or other services.

As illustrated in FIG. 2, the computing resource service provider 202, in various embodiments, includes an authentication system 220 and a policy management service 222. The authentication system, in an embodiment, is a computer system (i.e., collection of computing resources) configured to perform operations involved in authentication of users of the customer. For instance, one of the services may provide information from the users to the authentication service to receive information in return that indicates whether or not the user requests are authentic.

The policy management service 222, in an embodiment, is a computer system configured to manage policies on behalf of customers of the computing resource service provider. The policy management service 222 may include an interface that enables customers to submit requests related to the management of policy. Such requests may, for instance, be requests to add, delete, change or otherwise modify policy for the customer or for other administrative actions, such as providing an inventory of existing policies and the like. Other services and/or components may also be included in the environment 200. Similarly, techniques of the present disclosure apply to other environments.

The computing resource service provider 202, in various embodiments, is also equipped with a task service 224, such as the task service described with reference to numeral 108 in FIG. 1. The task service 224 is configured to receive a task package from the customer 204 and enable executing tasks as dictated by the task package. The task service 224 may be configured to use any resource of the computing resource service provider 202, such as one or more instantiated virtual machines or virtual hosts, for executing the task. The task service 224 may configure the one or more instantiated virtual machines or virtual hosts to operate using a selected operating system and/or a selected execution application in accordance with a requirement of the customer 204.

Figure 3:
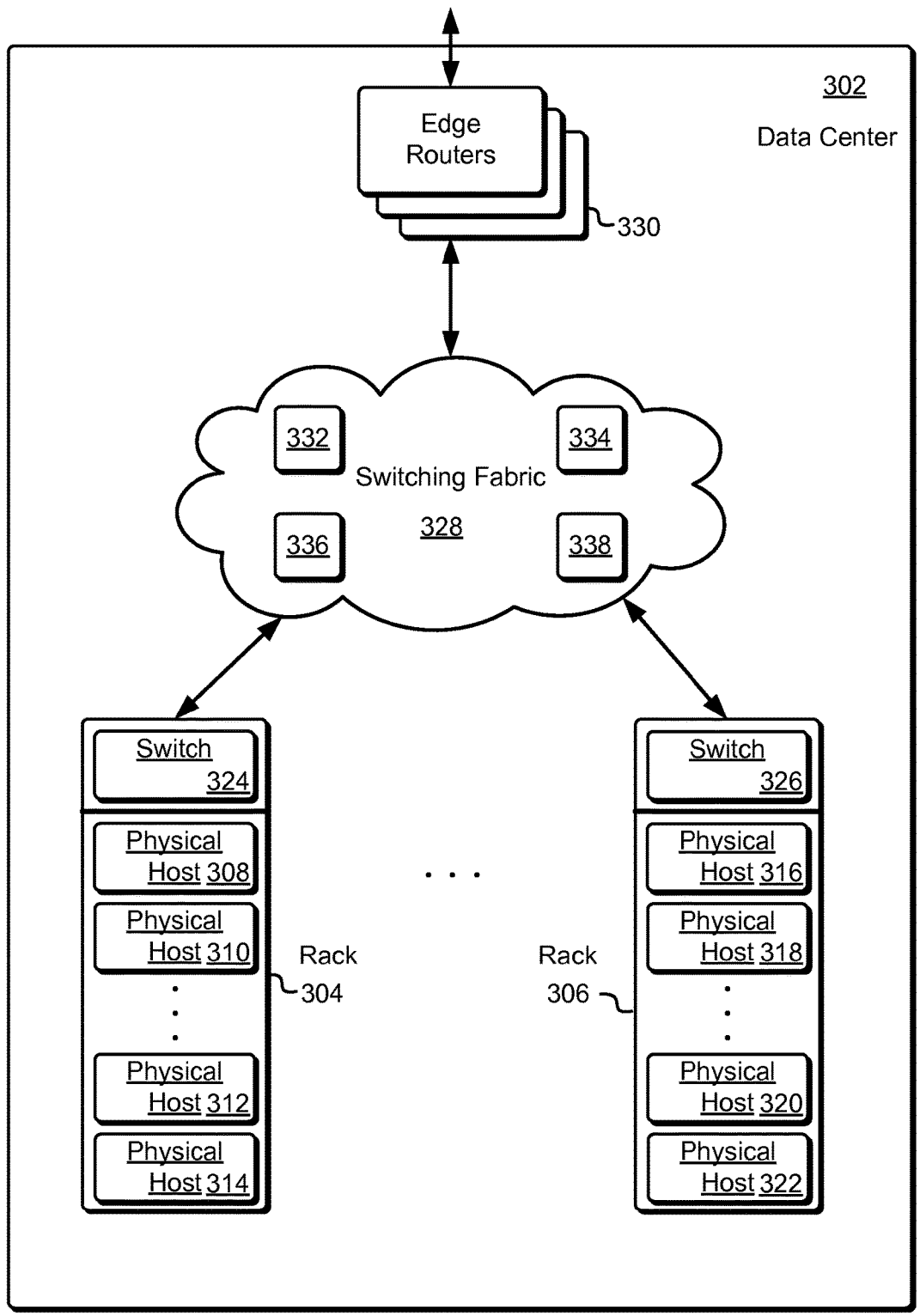
FIG. 3 depicts aspects of data centers in accordance with at least one embodiment.

FIG. 3 depicts aspects of data centers in accordance with at least one embodiment. A data center 302 may include multiple server racks 304-306. The data center 302 is an example of one or more data centers that may be used to implement a computing resource service provider, such as the computing resource service provider described with reference to numeral 202 in FIG. 2. The ellipsis between the server rack 304 and the server rack 306 indicates that the data center 302 may include any suitable number of server racks although, for clarity, only two are shown in FIG. 3. Each server rack 304-306 may participate in maintaining services such as electric power and data communications to multiple physical hosts 308-314 and 316-322. Again, the ellipses indicate that the server racks 304-306 may include any suitable number of physical hosts. For example, the physical hosts 308-322 may include one or more virtual computing system service servers, and/or one or more data store servers.

In FIG. 3, each server rack 304-306 is depicted as including a rack switch 324-326. The rack switches 324 and 326 may be responsible for switching packets of digital data to and from their respective sets of physical hosts 308-314 and 316-322. The rack switches 324-326 may be communicatively linked to a data center switching fabric 328 and then to a set of edge routers 330 that connects the data center 302 to one or more other computer networks including the Internet. The switching fabric may include any suitable set of networking components including multiple interconnected switches 332-338 (for clarity, only four are shown in FIG. 3) of one or more switch types arranged in one or more switching layers, as well as routers, gateways, bridges, hubs, repeaters, firewalls, computers, and suitable combinations thereof. In at least one embodiment, the rack switches 324-326 and the edge routers 330 are considered part of the switching fabric 328.

Tasks that are sought to be executed by a user may be serviced and scheduled by a task service of the computing resource service provider. The task service enables the execution of tasks on any execution environment, such as operating system, and using any tools, such as computer executable programs. The task service may instantiate an execution environment and configure the execution environment for task execution. The task service further enables sending the task to the execution environment, monitoring the task to ensure the task is completed or is executed properly and following user instructions upon the success or failure of the execution of the task.

The task service is advantageous in that it enables the execution of tasks using any execution environment. Further, the task service described herein has the flexibility to serve users with various needs. For example, a user that has three web servers that execute on the same environment may desire for a task affecting the three web servers to be executed on a similar environment as the three web servers, whereas another user utilizing a different execution environment for their servers or hosts may seek to schedule a task for execution on the execution environment utilized by their servers or hosts.

Figure 4:
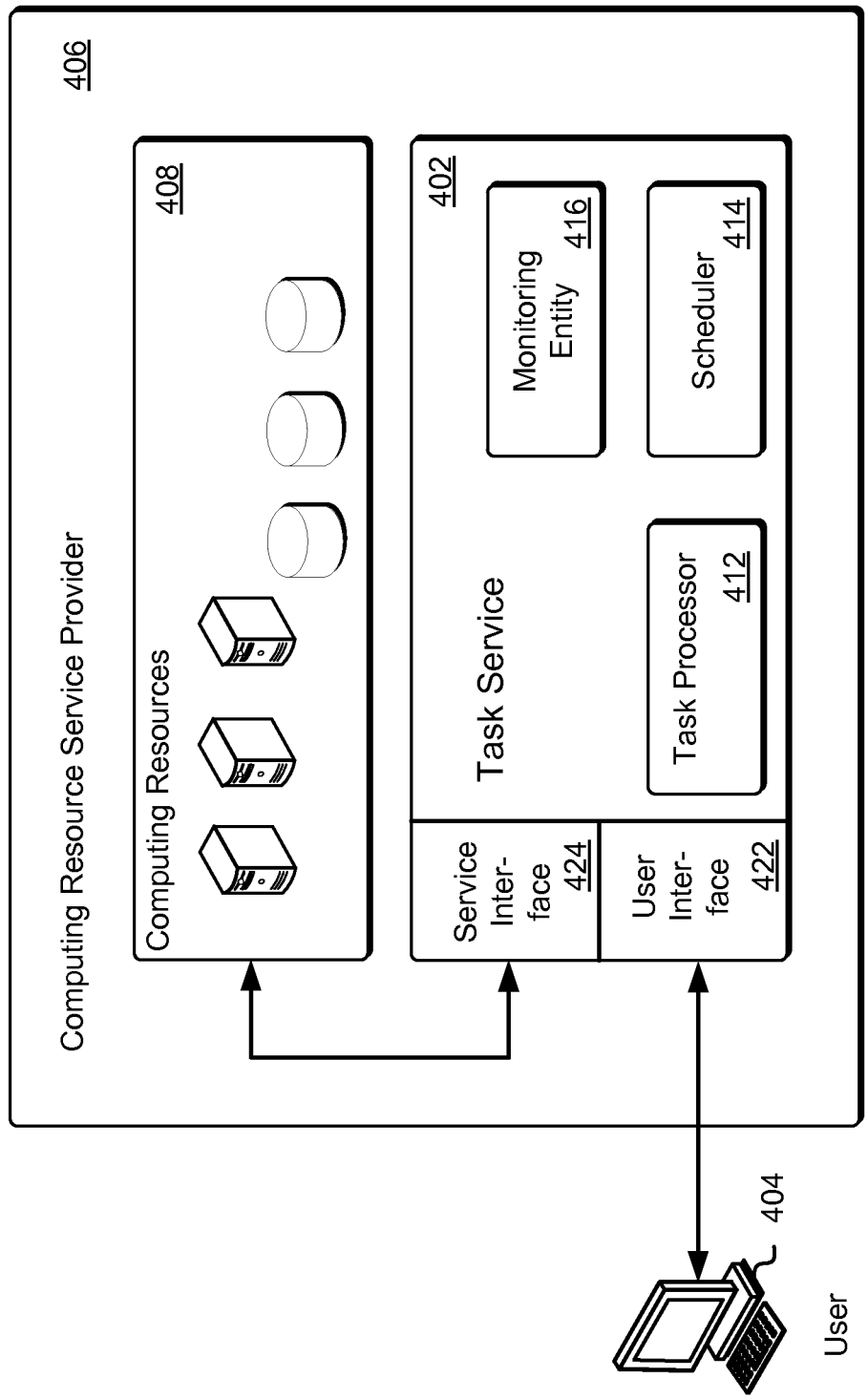
FIG. 4 shows an example of a task service or a computing resource service provider.

FIG. 4 shows an example of a task service of a computing resource service provider. The computing resource service provider 406 includes a task service 402 and computing resources 408, which may include a virtual computer system service and a block level data storage service, among others. It is recognized that the computing resource service provider 406 may include other services, entities or functions that are, for ease of description, not shown or described with reference FIG. 4. The computing resources 408 may include one or more hosts, storage resources or input/output resources that provide a computing platform and resources for the execution of tasks. The one or more hosts may be virtual computing platforms or physical computing platforms. Further, as described herein the one or more hosts may be used for task execution or to provide services to users, such as web server hosting, email server hosting or database management.

The task service 402 includes a task processor 412, a scheduler 414 and a monitoring entity 416. The task processor 412 receives a task package through a user interface 422 from a user 404 and processes the package to identify the task sought to be executed by the user, a trigger for the task, the execution environment in which the task is sought to be executed and any tools required for the execution of the task. As described herein, the user interface 422 may be a web services interface. The task or the task package may be received as computer-executable commands and may be equipped with return codes that indicate the progress, success or failure of the execution of the task or a portion thereof. As the task is being executed by an assigned host, the return codes may operate as notifications to the monitoring entity 416 of the progress of the execution of the task.

Upon execution, the return codes may cause numeric values to be provided to the task service. Each return code may indicate the success or failure of the execution of a segment or a portion of the task and/or of the whole task. Further, the task may include exit logic, which may be used to determine actions that are to be performed following successful or failed task execution.

The scheduler 414 uses the trigger to schedule the execution of the task. If the trigger is time-based, the scheduler 414 may place the task in an execution queue and initiate the execution of the task at the time dictated by trigger. To ensure that the task is executed timely, the scheduler 414 may begin configuring the requisite execution environment prior to the temporal trigger in order to ensure that the execution environment is ready to execute the task at the occurrence of the temporal trigger.

The monitoring entity 416 monitors the progress of task execution, for example, using received return codes from a host. If the monitoring entity determines that a task failed to execute properly or completely, the monitoring entity 416 may notify the scheduler 414 of the execution failure and the scheduler 414 may cause actions specified by the exit logic to be performed. For example, the scheduler may reschedule or reinitiate task execution if such is specified by the exit logic. Before an execution environment begins task execution, the monitoring entity 416 may also monitor the execution environment to determine whether the execution environment was successfully instantiated or configured for the execution of the task. If the monitoring entity 416 determines that the execution environment was not successfully instantiated or configured for the execution of the task, the monitoring entity 416 may notify the scheduler 414 and the scheduler 414 may select another execution environment for executing the task and configure the execution environment for task execution.

The monitoring entity 416 may also determine whether a task was successfully executed based on whether the execution of the task yielded an outcome. If the monitoring entity 416 determines that an outcome as dictated by the task was provided, the monitoring entity 416 may conclude that the execution of the task was successful. The monitoring entity 416 may also monitor the length of time a task consumes to be executed or the storage and processing costs associated with executing the task. Tasks that exceed certain execution time limits or costs may be terminated.

The execution of a task may often necessitate access to data or information present on other hosts, storage volumes or execution environments of the computing service resource provider 406. The other hosts, storage volumes or execution environments may be utilized by the user for performing various functions. To enable proper access to these entities, it is expected that the task provided by the user include authentication information for the other hosts, storage volumes or execution environments. When a task is executed, the authentication information may be used to enable access to the other hosts, storage volumes or execution environments.

When an execution environment of the computing resources 408 completes the execution of a task or when the resources of the execution environment are no longer required for the execution of a task, the execution environment or the execution environment's resources may be reallocated for other purposes. The resources comprising execution environment (e.g. computing resources supporting one or more virtual computer system instances) may, for example, be reallocated to be used as a web server or an application server for the user or any other user the computing service resource provider 406.

As described herein, a user, such as customer 404 described with reference to FIG. 4, may seek to have a task executed. A task may be any action for which the resources of a computing resource service provider are used. For a task to be executed, the computational, storage or input and output resources of the computing resource service provider may be used. Examples of a task include performing maintenance of a fleet of hosts, checking to ensure that security or a firewall has not been changed and collecting statistics from a monitoring system and reporting the statistics.

The execution of a task may be contingent upon a trigger occurring or a triggering condition being met. The task may be time-triggered task, whereby the task may be sought to be executed at a particular time, at a particular rate or at a particular time every interval of time. Examples of a time-triggered task include a task that is sought to be executed at noon on a given day, at noon every day or every four hours. Alternatively, the task may event-triggered, whereby it is required for an event to occur or take place in order for the task to occur. Further, an event-triggered task may be chained, whereby the execution or initiation of the task is contingent upon the execution, initiation or outcome of another task.

The user may determine the task to be executed and the trigger associated with the task. The user may further determine an execution environment for the task. The execution environment may be a type of host or type of computational resources used for executing the task or an operating system that runs on the host and facilitates the execution of the task. A computing service resource provider may offer one or more types of hosts that vary in capability and usage cost and the user may determine the type of host used in executing the task in order to control any cost associated with executing the task. The user may select an operating system that suits the nature of the task and the operating systems of other hosts that may exchange information with the host executing the task. By way of example, if the execution of the task requires communication or data exchange with a number of other hosts that run using one operating system, then the operating system selected for the execution of the task may be the same as the operating system of the other hosts. Further, the operating system may be selected in a manner that ensures that the tools required to execute the task are available for the selected operating system. Examples of an operating system include a Window server operating system or a Linux operating system as known to those skilled in the art.

Specifying an execution environment may also include determining one or more tools necessary for the execution of the task. The one or more tools may be computer programs that are configured to be executed using an operating system on a host and the one or more tools may facilitate the execution of the task. A tool may be a program in which a code written in a programming language may be executed. Examples of the tools include Windows PowerShell. The user may specify or indicate the task, type of host, operating system and one or more tools to a task service, such as the task service described with reference to numeral 224 in FIG. 2, of a computing resource service provider to schedule the task or initiate the execution of the task.

Figure 5:
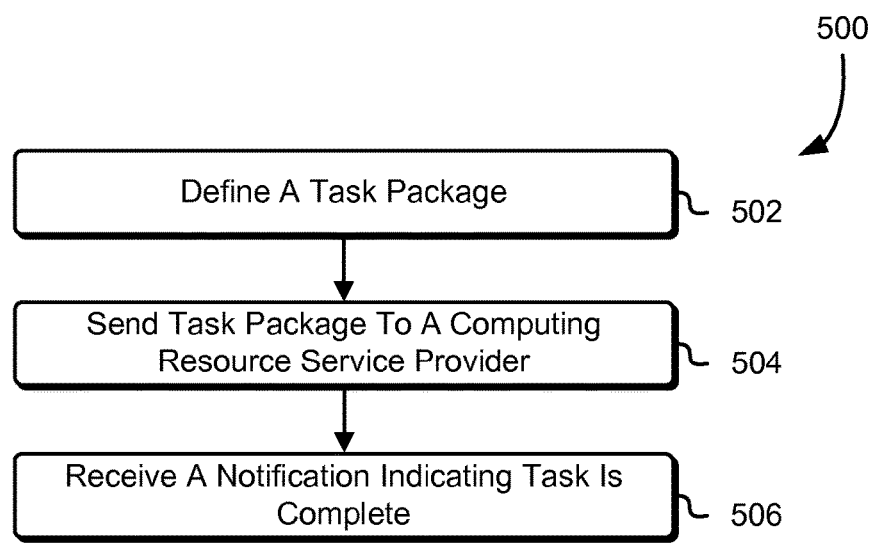
FIG. 5 shows an example of a method for providing a task package by a user to a task service.

FIG. 5 shows an example of a method for providing a task package by a user to a task service. In the process 500, the user defines 502 a task package. The task package specifies one or more of the task, trigger, execution environment and exit logic. The user may be equipped with a portal of the computing resource service provider using which a general purpose computer-executable programming code or language may be used to describe the task package. The user then sends 504 the task package to a computing resource service provider, for example, as an application programming interface (API) function call. The computing resource service provider or the task service of the computing resource service provider may be equipped to receive task packages that are defined in accordance with any general-purpose computer instruction language. As described herein, the computing resource service provider may cause the execution of the task to be performed using its resources, for example, a host of the computing resource service provider. The computing resource service provider then sends a notification to the user indicating the progress or status of the execution of the task. Upon completion of the task, the computing resource service provider also sends a notification to the user indicating that the task is complete. The user receives 506 the notification indicating that the task is complete. It is noted that at any point during task execution, the user may be notified of the progress of task execution.

When a task service, such as task service 402 described with reference to FIG. 4, receives task package from a user, the task service causes the task to be performed using the computational resources of the computing resource service provider. After the task is executed, the task service may cause the actions specified by the exit logic of the task to be performed. For example, the task service may release the execution environment or use the execution environment for the execution of another task. Releasing the execution environment may cause the computing resources of the execution environment to join a pool of computing resources available for use. When virtualization is used and the execution environment comprises virtual resources (e.g., virtual computer system instances), the execution environment's underlying resources may be made available or may be allocated to other users or customers or other tasks. When the execution environment comprises components that are not virtualized, such as a physical computer, server or processor, the components may be made available for use by other users or to perform other tasks.

Figure 6:
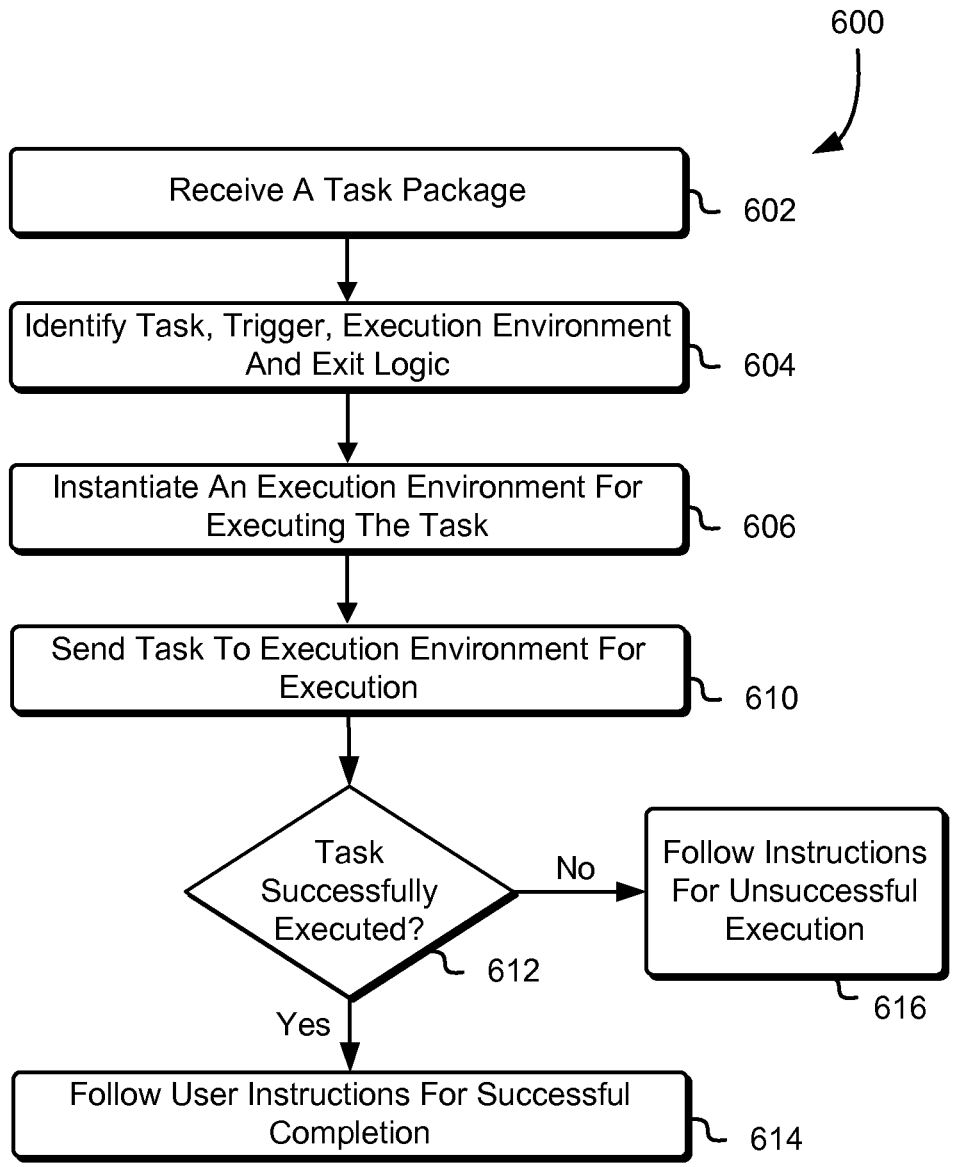
FIG. 6 shows an example of a method for initiating the execution of a task by a task service.

FIG. 6 shows an example of a method for initiating the execution of a task by a task service. In the process 600, the task service receives 602 a task package from a user. The task service identifies 604 the task to be executed, a trigger for the task, an execution environment requested for the task and exit logic for the task. The task may be provided as computer-executable commands. When the trigger for the task occurs or at a time before the trigger occurs, the task service instantiates 606 an execution environment for executing the task. Instantiating the execution environment may be performed, for example, by powering a host, causing a virtual host to become available or causing the computational resources for the host to become available.

Instantiating the execution environment may include configuring the execution environment with tools for executing the task. The task service may configure the execution environment by installing on the execution environment an operating system specified in the task package. The task service may configure the execution environment with the tools necessary for executing the task by equipping the execution environment with any computer-readable packages that enables the execution environment to decode the computer-readable instructions of the task. For example, if the task as specified in the task package is described in a Python general-purpose programming language, the task service may configure the host to read, interpret and execute Python command by equipping the host with a Python decoding package.

The task service then sends 610 the task to the execution environment for execution. The task may be sent in the form of computer-executable commands as received from the user. Further, as described herein, the computer-executable commands of the task may configured to provide return codes upon task execution. The return codes enable monitoring the task to ensure successful or complete execution. The task service determines 612 whether the task was successfully executed. If it is determined that the task was successfully executed, the task service follows 614 user instructions for successful completion. The user instructions for successful completion may be specified in the exit logic of the task package. The user instructions may indicate that another task should be performed upon the successful completion of the task at hand or that the execution environment be released, among others. If, on the other hand, the task service determines that the task was not successfully executed, the task service follows 616 user instructions for unsuccessful execution. The user instructions for unsuccessful execution may be included in the exit logic of the task package and may include causing a portion of the task to be executed (for example, the portion whose execution failed) or releasing the execution environment, among others. It is noted that a task is deemed to have been successfully executed if the actions requested by the user are performed and their associated outcome, if any, is provided and successful execution of the task is independent of whether an outcome of the task is favorable to the user. Determining whether the task was successfully executed may be based at least in part on the return codes that are produced as a result of task execution, whereby one return may indicate that a task was successfully executed, whereas another return code may indicate that the execution of the task has failed.

A task may be triggered as a result of the occurrence of a time trigger or an event trigger. Time-triggered tasks may be scheduled at a particular time when the task is sought to be executed. Event-triggered tasks, on the other hand, are contingent upon an event taking place to be executed. A scheduler of a task service, such as scheduler 414 of task service 402 described with reference to FIG. 4, may schedule time-triggered tasks for execution. Event-triggered tasks for which the scheduler becomes aware of the occurrence of the event may also be scheduled by the scheduler. For example, a chained task that is triggered based on the successful execution of another task or the issuance of an outcome of the other task may be scheduled by the scheduler since the scheduler becomes aware of the occurrence of the trigger. If, on the other hand, the event is outside the knowledge of the scheduler, an execution environment may be instantiated and configured to monitor for the occurrence of the trigger or execute the task.

Figure 7:
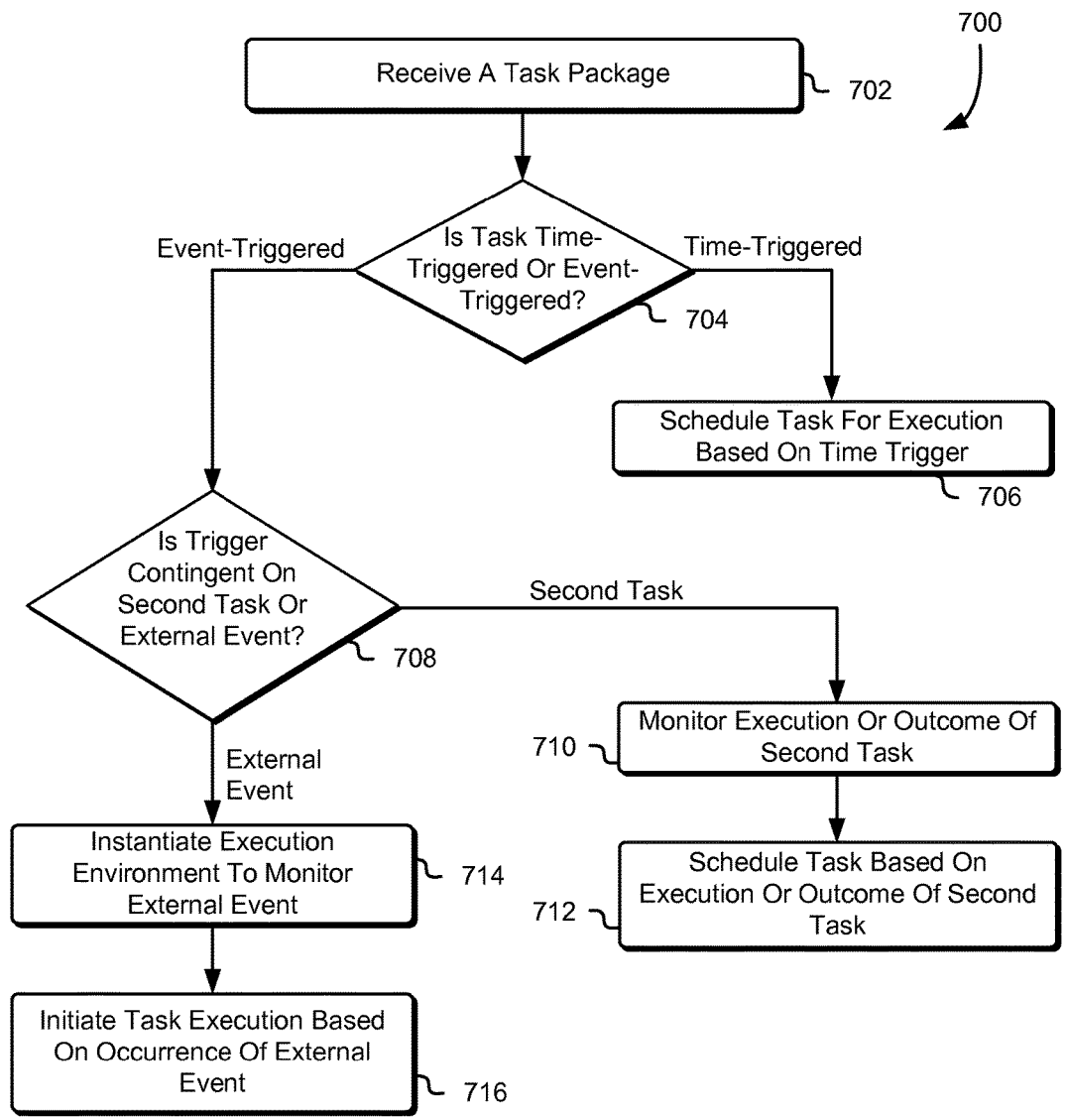
FIG. 7 shows an example of a method for scheduling time-triggered and event-triggered tasks.

FIG. 7 shows an example of a method for scheduling time-triggered and event-triggered tasks. In the process 700, a task service receives 702 a task package and determines 704 whether the task is time-triggered or event-triggered. If the task is time-triggered, the task service schedules 706 the task for execution based on the occurrence of the time trigger. If the task is event-triggered, the task service determines 708 if the trigger is contingent upon the execution or the outcome of a second task or if the trigger is contingent upon an external event. If the task service determines that the trigger is contingent upon the execution or the outcome of a second task, the task service monitors 710 the execution or the outcome of the second task. The task service then schedules 712 the task at hand based on the execution or the outcome of the second task.

If, on the other hand, the task service determines the trigger is contingent upon an external event, the task service may not be aware that the trigger occurred and may not be notified of the occurrence of the trigger. Accordingly, the task service may instantiate 714 an execution environment to monitor the external event and upon the occurrence of the external event the task service, the execution environment may notify the task service, which initiates 716 the execution of the task. The execution environment may report the occurrence of the external event to the task service. Alternatively, to minimize any time delay, the task service may configure the execution environment to both monitor the external event and execute the task without notifying the task service of the occurrence of the trigger or receiving an acknowledgement or instruction from the task service.

Unless the user requests otherwise, it is often important that the task be only executed once as duplicate execution of tasks may have adverse consequences. The task service of the computing resource service provider is advantageous in that it handles and enables task execution for the user and ensures that a task provided by the user proceed to execution and is in fact executed and results in an outcome. The task service of the computing resource service provider is in contrast to other task scheduling schemes, where a user may utilize their own host for task scheduling and execution. When a user utilizes their own hosts for task scheduling and execution, there may be uncertainty as to whether the tasks will be executed. For example, if a host or server responsible for scheduling or executing the tasks fails, the task may not get executed. For redundancy, the user may charge one or more additional hosts with scheduling and executing the desired task, for example, in the event that the first host fails. However, when multiple hosts are used for scheduling and executing the task, communication overhead may be incurred in order to ensure that the task proceeds to execution.

Furthermore, the task service of the computing service resource provider is advantageous in that it permits executing the task using any execution environment whereas, if a user commissions a host with task scheduling and execution, the task may be executed using only the execution environment of the host. In addition, it is the responsibility of the user to ensure that the tools required for executing the task are available for use.

Figure 8:
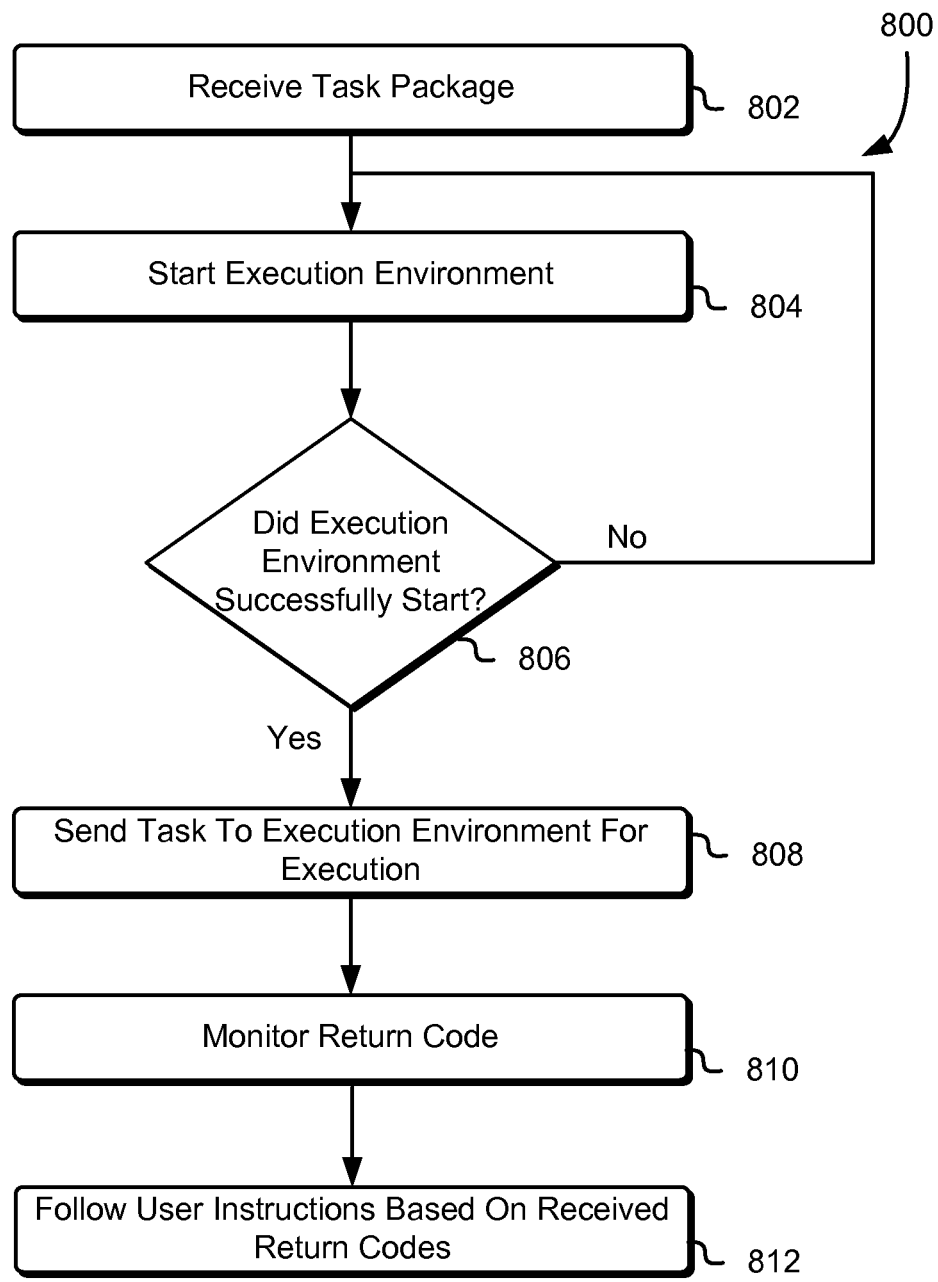
FIG. 8 shows an example of a method for ensuring successful execution of tasks.

FIG. 8 shows an example of a method for ensuring successful execution of tasks. In the process 800, the task service receives 802 a task package. The task package may be received by the task service as computer-executable commands and the task may be configured to cause the generation of one or more return codes upon execution. The return codes may indicate to the task service that a portion of the computer-executable commands of the tasks have been executed or that an action should be taken.

Before or upon the occurrence of a trigger, the task service then starts 804 an execution environment for executing the task. The task service or the monitoring entity of the task service determines 806 whether the execution environment successfully started. If it is determined that the execution environment did not successfully start, the task service restarts the execution environment. If it is determined that the execution environment started successfully, the task service sends 808 the task to the execution environment. The task service or the monitoring entity of the task service monitors 810 return codes received from the execution environment as a result of task execution. The return codes may indicate success, failure or progress of task execution. The task service then follows 812 user instructions based on the received return codes. The user instruction may call for re-executing the task or a portion thereof or ceasing task execution, for example.

At any point, the task service may determine whether the length of time consumed in the execution of the task exceeded a threshold and on the condition that the length of time consumed in the execution of the task exceeded the threshold, the execution of the task may be terminated or the task may be sent to a different host for execution. Further, at any point, the task service may determine whether the resources consumed by the task, for example, computational resources or storage resources, exceeded a given limit or the costs associated with the resources exceeded a certain limit. Upon determining that the resources or their costs exceeded a limit, the execution of the task may be terminated or the task may be sent to a different host for execution.

Alternatively, the task service may also determine whether a task was successfully executed based on whether the task yielded an outcome, whereby if an outcome is provided, then the task is deemed successful and if an outcome is not provided then the task may be deemed to be unsuccessful. An outcome of a task may be an action taken as a result of the execution or the completion of the task including, by way of example, providing data for storage or sending a notification.

Figure 9:
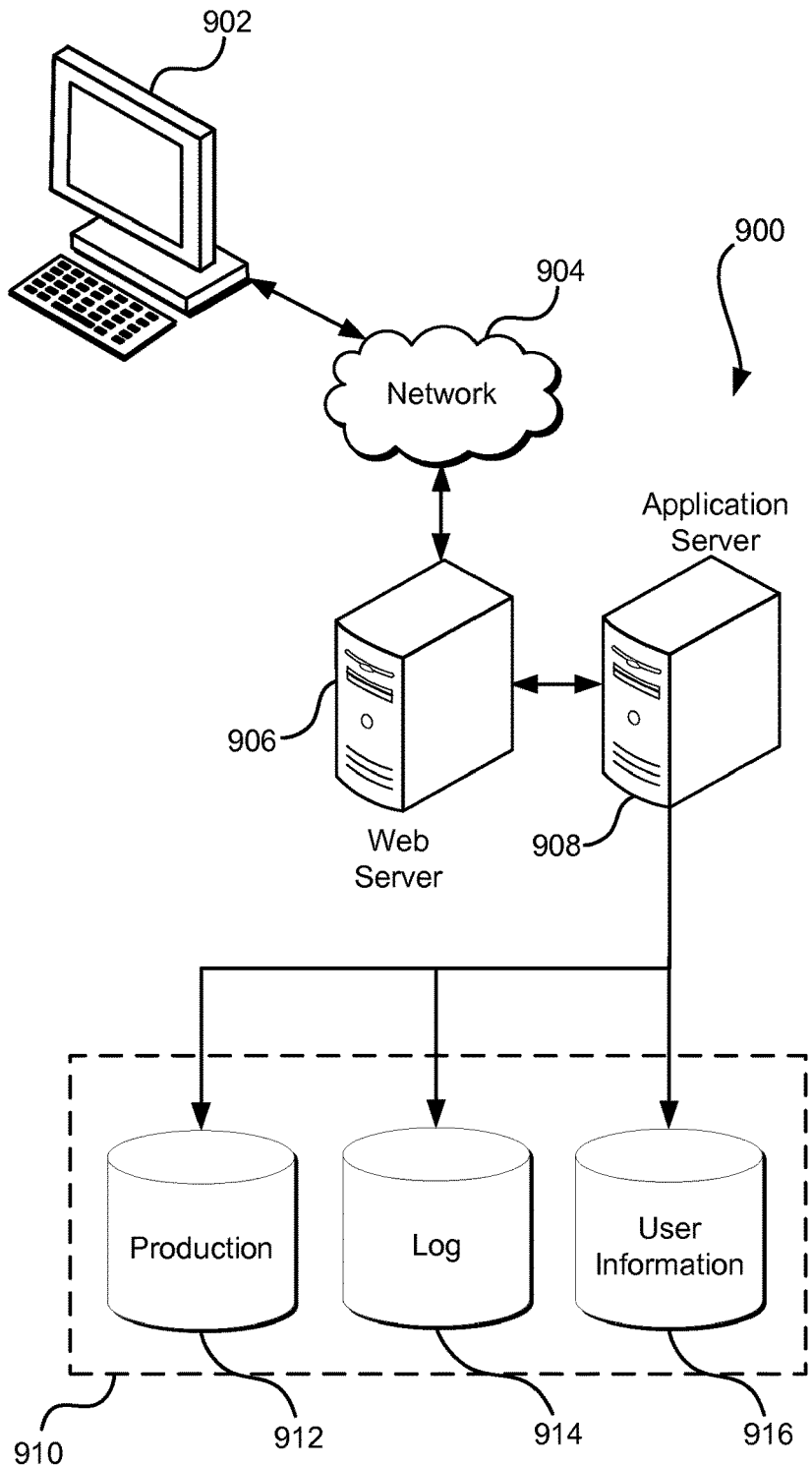
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling some (even a majority) of the data access and business logic for an application. The application server may provide access control services in cooperation with the data store and is able to generate content such as text, graphics, audio and/or video to be transferred to the user, which may be served to the user by the web server in the form of HyperText Markup Language ("HTML"), Extensible Markup Language ("XML") or another appropriate structured language in this example. The handling of all requests and responses, as well as the delivery of content between the client device 902 and the application server 908, can be handled by the web server. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed system.

The data store 910 can include several separate data tables, databases or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members used in the above conjunctive phrase, "at least one of A, B, and C" and "at least one of A, B and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C to each be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    receiving, at a first service, a task package from a user, the task package including a task, a trigger for the task, exit logic, a user-specified execution environment, and an indication of a property of a host that will exchange information with one or more computer systems during task execution, the trigger being from a set of trigger types that includes a time trigger and an event trigger, the execution environment comprising a collection of one or more computing resources that collectively execute the task;
    interacting with at least another service to cause the other service to instantiate the execution environment in accordance with the trigger;
    sending the task to the execution environment instantiated for execution upon an occurrence of the trigger;
    causing, based at least in part on the interaction with the other service and in response to an occurrence of the trigger, the execution environment to execute the task to form an executing task;
    monitoring the task execution by the execution environment;
    upon completion of the task execution, obtaining a return code from the task execution, wherein the return code is a numeric value indicating at least one of a progress, a success, or a failure of the task execution;
    detecting, based at least in part on the return code, a particular outcome of the task execution; and
    performing, based at least in part on or more actions indicated in the exit logic, an operation in response to the particular outcome, the one or more actions indicating a set of operations, of which the operation is a member, to perform in response to a set of outcomes, of which the particular outcome is a member.

2. The computer-implemented method of claim 1, wherein:
    the method further comprises:
        determining whether the trigger is the time trigger or the event trigger; and
        in response to determining that the trigger is the time trigger:
            scheduling the task for execution upon an occurrence of the time trigger; and
            instantiating the execution environment occurs prior to the time trigger.

3. The computer-implemented method of claim 1, further comprising:
    determining whether the trigger is the time trigger or the event trigger;
    in response to determining that the trigger is the event trigger, determining whether the trigger is contingent upon an execution of a second task or an external event;
    in response to determining that the trigger is contingent upon the execution of the second task, scheduling the task for execution as a result of an occurrence of the trigger; and
    in response to determining that the trigger is the external event, instantiating a second execution environment to monitor the external event.

4. The computer-implemented method of claim 1, further comprising:
    determining whether the execution environment is instantiated successfully; and
    in response to determining that the execution environment was not instantiated successfully, reinstantiating the execution environment or instantiating a second execution environment for task execution.

5. The computer-implemented method of claim 1, wherein:
    the particular outcome is that the task was successfully executed; and
    performing the operation further includes following a set of user instructions for successful completion of the task.

6. The computer-implemented method of claim 1, further comprises determining whether task execution by the execution environment is completed based at least in part on the return code.

7. The computer-implemented method of claim 1, wherein the other service provides virtual computer system services.

8. A computer-implemented method, comprising:
    receiving a task package at a first service, the task package specifying a task, a trigger, exit logic, and a user-specified execution environment for the task, the trigger being from a set of trigger types that includes a time trigger and an event trigger, the task package further indicating a property of a host that will exchange information with the execution environment during execution of the task;
    interacting with a second service to cause the second service to instantiate the execution environment for task execution according to the execution environment specified;
    sending the task to the execution environment for execution;
    causing, in response to an occurrence of the trigger, the second service to configure the execution environment to execute the task to form an executing task;
    upon completion of execution of the task, receiving a return code from the executing task wherein the return code is a numeric value indicating at least one of a progress, a success, or a failure of the executing task; and
    performing one or more operations based at least in part on the exit logic and the return code, the exit logic specifying a set of operations, including the one or more operations, to perform in response to a set of return codes.

9. The computer-implemented method of claim 8, further comprising:
   determining whether the task execution is completed or not completed; and
   in response to determining that the task execution is not completed, following the exit logic for an incomplete task execution specified in the task package.

10. The computer-implemented method of claim 8, wherein causing the execution environment to execute the task upon the occurrence of the trigger includes requesting the execution environment to monitor the occurrence of the trigger and begin executing the task upon the occurrence of the trigger.

11. The computer-implemented method of claim 8, further comprising:
   determining whether the trigger is the time trigger or the event trigger; and
   in response to determining that the trigger is the time trigger:
      scheduling the task for execution upon the occurrence of the time trigger; and
      instantiating the execution environment for task execution prior to the time trigger.

12. The computer-implemented method of claim 11, further comprising:
   determining whether the task execution by the execution environment is completed; and
   causing, in response to determining that the task execution is completed, computing resources allocated to the execution environment to join a pool of computing resources available for use.

13. The computer-implemented method of claim 8, further comprising determining whether task execution by the execution environment is completed by determining whether an outcome is yielded by task execution.

14. A computing resource service provider, comprising:
   a computer system service comprising a first plurality of computing systems in a distributed computing environment, wherein the first plurality of computing systems provides one or more execution environments for executing a task; and
   a task service comprising a second plurality of computing systems in the distributed computing environment, the second plurality of computing systems implementing:
      a task processor that receives a task package including a task, the task package specifying:
         a trigger from a set of trigger types, the set of trigger types including a time trigger and an event trigger;
         a user-specified execution environment, selected from the one or more execution environments;
         a property of a host that will exchange information with the user-specified execution environment during task execution; and
         an exit logic that indicates a set of operations to be performed in response to a set of return codes;
      a scheduler that, based at least on interfacing with the computer system service, instantiates the user-specified execution environment and schedules the task for execution by the user-specified execution environment; and
      a monitoring entity that:
         monitors instantiation of the user-specified execution environment and the execution of the task;
         upon completion of the execution of the task, obtains a return code of the set of return codes from the execution of the task, wherein the return code is a numeric value indicating at least one of a progress, a success, or a failure of the execution of the task; and
         causes, based at least in part on the return code and the exit logic, one or more operations of the set of operations to be performed.

15. The computing resource service provider of claim 14, wherein the scheduler further releases the execution environment on a condition that the monitoring entity determines that task execution by the execution environment is completed.

16. The computing resource service provider of claim 14, wherein the scheduler further schedules the task for execution upon occurrence of the trigger.

17. The computing resource service provider of claim 14, wherein the task package specifies the execution environment or one or more tools for executing the task.

18. The computing resource service provider of claim 14, wherein the exit logic specifies user-defined instructions for performing the one or more operations upon an occurrence of a particular outcome of the task indicated based at least in part on the return code.

19. The computing resource service provider of claim 14, wherein the scheduler further reinstantiates the execution environment on a condition that a previous instantiation of the execution environment failed.

20. One or more non-transitory computer-readable storage media having collectively stored thereon instructions that, as a result of execution by one or more processors of a system, cause the system to:
   receive a task package at a first service, the task package specifying a task, a trigger for the task, an exit logic, and a user-specified execution environment, the trigger being from a set of trigger types that includes a time trigger and an event trigger, the task package further indicating a property of a host that will exchange information with the execution environment during execution of the task;
   interact with at least a second service to cause the second service to instantiate the execution environment in accordance with the execution environment specified to form an instantiated execution environment;
   configure the instantiated execution environment for task execution;
   send the task to the execution environment for execution;
   cause, based at least in part on the interaction with the second service and in response to an occurrence of the trigger, the execution environment to execute the task to form an executing task;
   upon completion of the execution of the task, receive a return code from the executing task, wherein the return code is a numeric value indicating at least one of a progress, a success, or a failure of the execution of the task; and
   perform, based at least in part on information indicated in the exit logic, one or more operations that correspond to the return code.

21. The one or more non-transitory computer-readable storage media of claim 20, wherein the instructions further cause the system to monitor the execution of the task by the execution environment.

22. The one or more non-transitory computer-readable storage media of claim 20, wherein the task is executed upon an occurrence of the trigger.

23. The one or more non-transitory computer-readable storage media of claim 22, wherein if the trigger is an event trigger that is contingent upon a particular outcome of a second task, executing the task as a result of an occurrence of the particular outcome of the second task.

24. The one or more non-transitory computer-readable storage media of claim 20, wherein the instructions further cause the system to:
  determine whether task execution is completed; and
  in response to determining that the task execution is completed, perform one or more operations specified in the task package.

25. The one or more non-transitory computer-readable storage media of claim 20, wherein determining whether the task execution by the execution environment is completed includes determining whether an outcome is yielded by the task execution.

* * * * *